United States Patent [19]
Adachi

[11] Patent Number: 5,827,159
[45] Date of Patent: Oct. 27, 1998

[54] COMBINATION TOOL CHANGER AND STORAGE DEVICE FOR DIE CUTTER

[76] Inventor: Hiroshi Adachi, c/o Sanwa Machine Co., Ltd., 8-3, Kyomachibori 2-chome, Nishi-ku, Osaka-shi, Osaka 550, Japan

[21] Appl. No.: 855,536

[22] Filed: May 13, 1997

[30] Foreign Application Priority Data

May 15, 1996 [JP] Japan .................................. 8-146714

[51] Int. Cl.[6] .................................................. B23Q 3/155
[52] U.S. Cl. ............................... 483/29; 83/563; 83/564; 493/477
[58] Field of Search ................................... 483/1, 28, 29; 493/477, 355, 354; 83/698.71, 563, 564, 698.91

[56] References Cited

U.S. PATENT DOCUMENTS

| | | | |
|---|---|---|---|
| 4,078,461 | 3/1978 | Ohta ........................................ | 83/564 X |
| 4,086,837 | 5/1978 | Dyck ....................................... | 83/637 X |
| 4,476,762 | 10/1984 | Anderson, III et al. .................. | 83/640 |
| 4,646,600 | 3/1987 | Flick et al. .............................. | 483/29 X |
| 4,706,532 | 11/1987 | Hashimoto ............................... | 83/700 |
| 5,072,507 | 12/1991 | Meeks ..................................... | 483/1 |

FOREIGN PATENT DOCUMENTS

| | | |
|---|---|---|
| 1137447 | 12/1968 | European Pat. Off. . |
| 2595980 | 3/1986 | European Pat. Off. . |

*Primary Examiner*—William R. Briggs
*Attorney, Agent, or Firm*—Sughrue, Mion, Zinn Macpeak & Seas, PLLC

[57] ABSTRACT

A combination tool exchanger and storage device adapted to be fitted to a die cutter for exchanging and storing a plurality of profiled cutter dies each having a cutter blade of a different configuration. The die cutter is for cutting a sheet-like material by urging the sheet-like material against a selected one of the profiled cutter dies retained within a cutter die mounting chamber. The combination tool exchanger and storage device includes retaining arms for holding one of the profiled cutter dies so as to confront a first entrance leading to the cutter die mounting chamber and for sliding the profiled cutter die horizontally towards the cutter die mounting chamber, a cutter die storage chamber disposed above or below the die cutter, and an elevator unit for selectively driving the retaining arms between a first position aligned with the first entrance leading to the cutter mounting chamber and a second position aligned with a second entrance leading to the cutter die storage chamber.

9 Claims, 6 Drawing Sheets

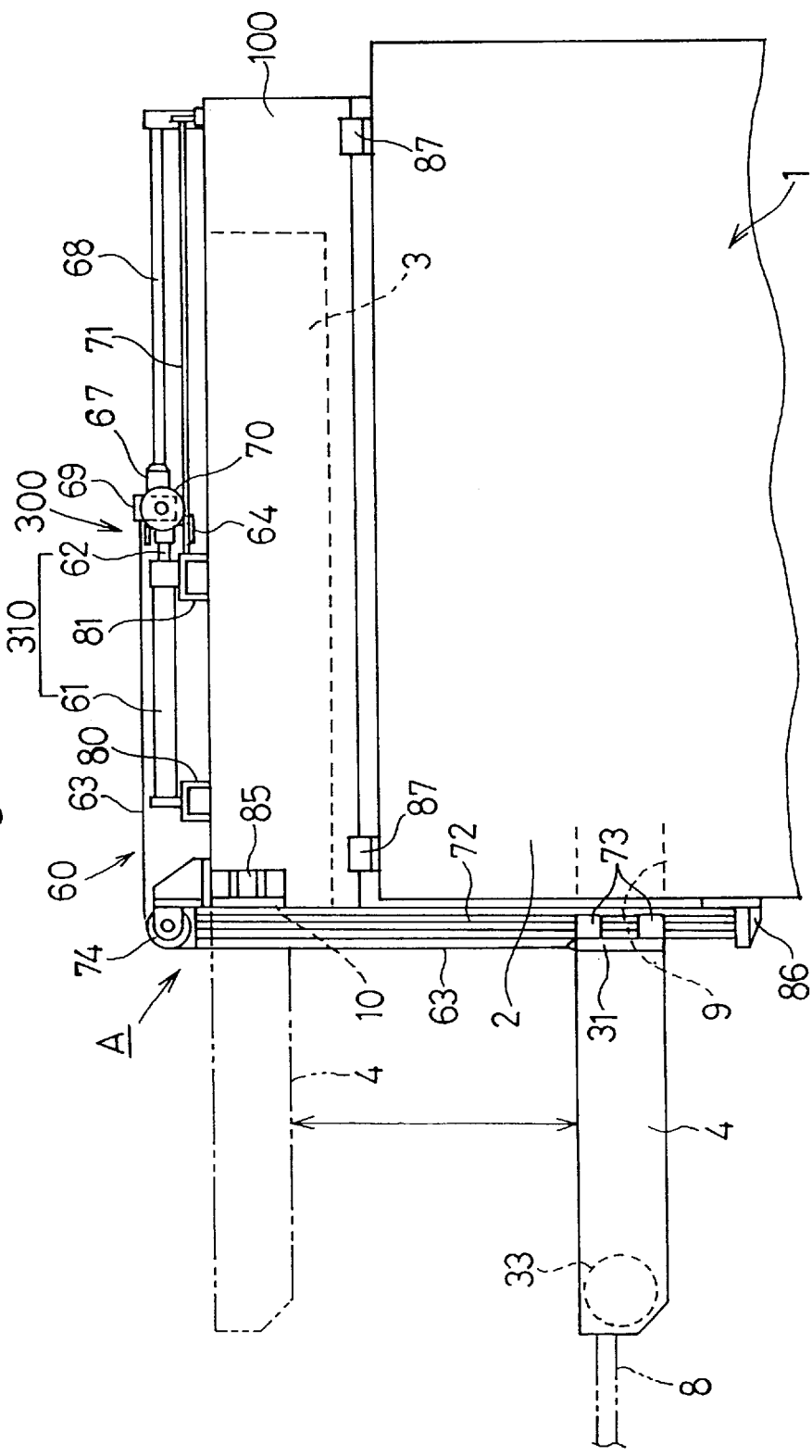

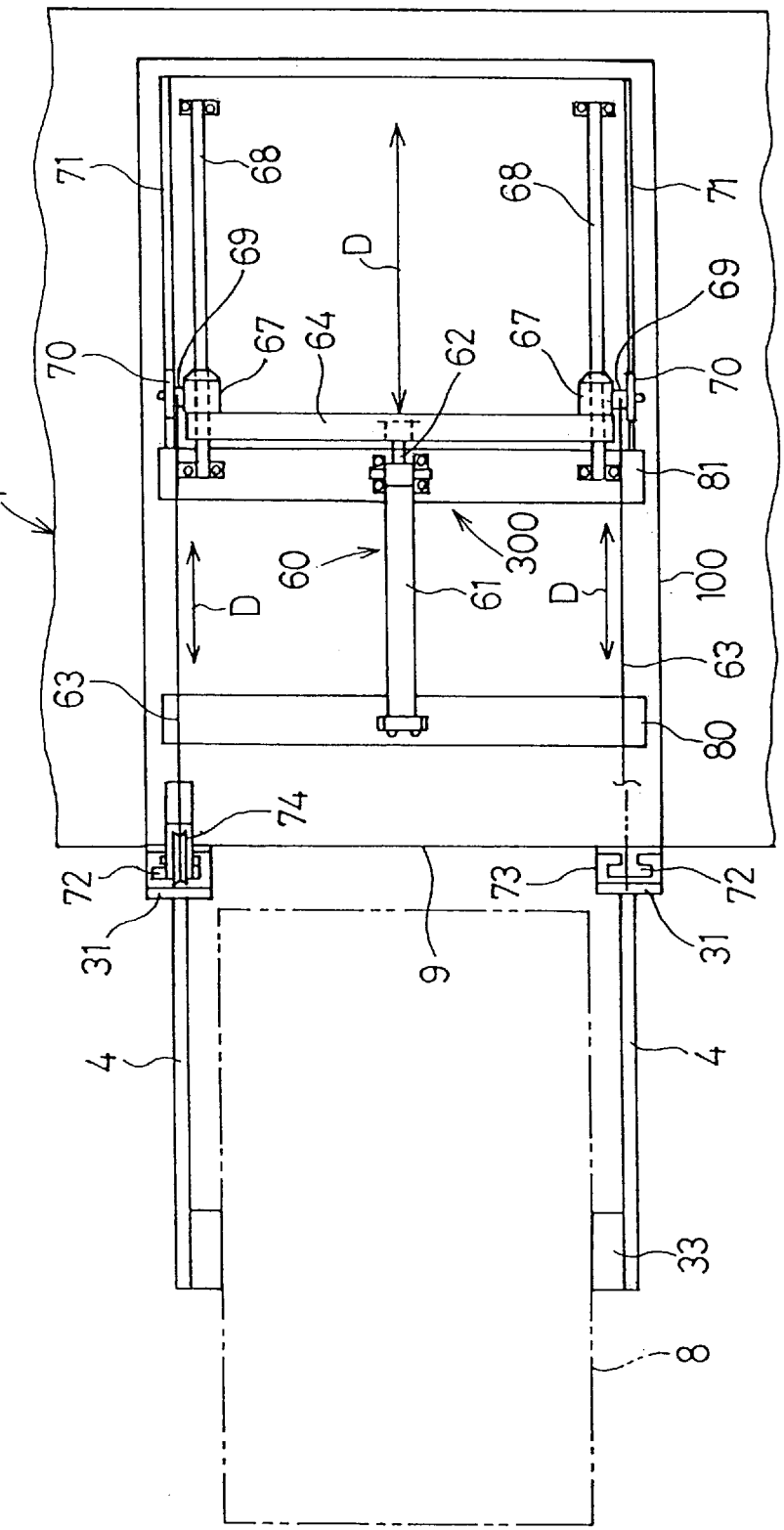

COMBINATION TOOL CHANGER AND STORAGE DEVICE FOR DIE CUTTER

BACKGROUND OF THE INVENTION

1. Field of the Invention

The present invention relates to a combination tool changer and storage device for changing and storing the profiled cutter dies, which is used with a die cutter for cutting a sheet-like material such as, for example, one or more cardboards by urging the sheet-like material against a cutter blade of any one of profiled cutter dies.

2. Description of the Prior Art

In making blank forms for packaging boxes for accommodating candies or cosmetic items or for book cases, a stack of cardboards forming a sheet-like material is generally cut by an automatic die cutter to provide such blank forms. This automatic die cutter is so designed and so structured that a stack of cardboards placed on a feeder is supplied one by one to a cutting station at which a press board supporting thereon the individual caraboard is driven upwards so as to be cut by a downwardly oriented cutter blade of a profiled cutter die so that a blank form of a configuration conforming to the profile of the cutter die can be obtained. The blank form so obtained is subsequently ejected after having been trimmed.

The profiled cutter die which is used at the cutting station is of a structure wherein a wooden die body having a profiled cutter blade fitted thereto is encased in an iron skeleton frame and is then bolted thereto. The profiled cutter die generally has a relatively great weight of about 50 Kg. This profiled cutter die is often replaced with a differently profiled cutter die each time blank forms of a different configuration is to be manufactured. Since any of the profiled cutter dies hitherto employed is relatively heavy, at the time of replacement which is generally effected after the die cutter is brought to a halt, two or three attendant workers jointly lift the profiled cutter die and place it on retaining arms. The profiled cutter die so placed on the retaining arms is then manually pushed to slide into the cutter die mounting chamber to complete the replacement. For this reason, the replacement of the profiled cutter die involves a cumbersome job of lifting the relatively heavy object, requiring a prolonged time to complete the replacement. Moreover, since the die cutter must be halted during the job of replacement being performed, the efficiency of utilization of the die cutter tends to be lowered.

SUMMARY OF THE INVENTION

The present invention has been developed with an aim of substantially eliminating the problems inherent in the prior art die cutter and is devised to provide a combination tool changer and storage device by which the replacement of the profiled cutter die can easily and quickly be performed.

In order to accomplish this and other objects of the present invention, the present invention provides a combination tool exchanger and storage device adapted to be fitted to the die cutter for exchanging and storing a plurality of profiled cutter dies. The combination tool exchanger and storage device includes retaining arms for holding one of the profiled cutter dies so as to confront a first entrance leading to the cutter die mounting chamber and for sliding the profiled cutter die horizontally towards the cutter die mounting chamber, a cutter die storage chamber disposed above or below the die cutter, and an elevator unit for selectively driving the retaining arms between a first position aligned with the first entrance leading to the cutter mounting chamber and a second position aligned with a second entrance leading to the cutter die storage chamber.

In this structure, since the retaining arm means for holding a selected one of the profiled cutter dies is employed for aligning the selected profiled cutter die with the first entrance of the cutter die mounting chamber, another one of the profiled cutter dies which is to be used subsequently can be assembled in situ on the retaining arm means while the die cutter is in operation. In other words, the profiled cutter die can be assembled, for example, by placing the iron skeleton frame on the retaining arm means, encasing in the iron skeleton frame a wooden template having a profiled cutter blade fitted thereto, and bolting the wooden template and the iron skeleton frame together. Since this assemblage of the profiled cutter die is carried out while the die cutter is in operation, no efficiency of utilization of the die cutter is lowered.

The next succeeding profiled cutter die which has been assembled in situ above the retaining arm means is, after the retaining arm means has been moved to the position confronting the second entrance of the cutter die storage chamber by the action of the elevating means, stored within the cutter die storage chamber for the time to come. Thus, the next succeeding profiled cutter die can be stored at a place which does not provide an obstruction to the work. The retaining arm means which has been emptied as a result of the profiled cutter die having been stored within the cutter die storage chamber is subsequently moved to the position confronting the first entrance of the cutter die mounting chamber by the action of the elevating means. After the previous cycle of cutting has completed, the previously used profiled cutter die is removed from the cutter die mounting chamber onto the retaining arm means which is subsequently lifted from the retaining arm means before it is lowered to the floor.

The empty retaining arm means is then moved to the position confronting the second entrance of the cutter die storage chamber and, after the next succeeding profiled cutter die has subsequently been removed onto the retaining arm means from the cutter die storage chamber, the retaining arm means is moved to the position confronting the first entrance of the cutter die mounting chamber and the profiled cutter die resting on the retaining arm means is then pushed to slide horizontal into the cutter die mounting chamber. In this way, the job of replacement of the profiled cutter die can easily and quickly be accomplished, accompanied by reduction in time required for the die cutter to be halted. Therefore, the efficiency of utilization of the die cutter can thus be increased.

It is, however, to be noted that the previously used profiled cutter dies can be accommodated within the cutter die storage chamber without being removed from the retaining arm means.

Preferably, the combination tool changer and storage device may include a plurality of rotary support members disposed within the cutter die storage chamber for slidably supporting any one of the profiled cutter dies with respect to the second entrance leading to the cutter die storage chamber, so that the relatively heavy profiled cutter die can easily be removed from and inserted into the cutter die storage chamber.

Preferably, the combination tool changer and storage device may also include pairs of rotary support groups each comprising a plurality of rotary support members disposed on a common plane are disposed in a plurality of stages, and a plurality of stages of storage spaces one for accommodating each profiled cutter die are formed. This is particularly advantageous in that the plural profiled cutter dies can be accommodated within the cutter die storage chamber.

In one preferred embodiment of the present invention, the elevating means comprises a screw rod disposed at a front plane, where the first entrance is formed in a cutting unit of the die cutter, so as to extend vertically and threadingly engaged with the retaining arm means, a rotary drive mechanism for driving the screw rod, and guide means for guiding the retaining arm means up and down along the screw rod as a result of rotation of the screw rod.

This arrangement makes it possible to selectively lift or lower the retaining arm means by the rotation of the screw rod smoothly and the position of the profiled cutter die retained by the retaining arm means with respect to the vertical direction can accurately be determined.

Preferably, the rotatory drive mechanism includes a drive motor for driving the screw rod, said drive motor being supported on a storage box forming the cutter die storage chamber. This feature makes it possible for the rotatory drive mechanism to be disposed on, for example, top of the storage box where a relatively large space is available, with no difficulty.

In another preferred embodiment of the present invention, the elevating means comprises a cable means for suspending the retaining arm means, a cable drive mechanism for moving the cable means, and a guide means for moving the retaining arm means up and down as a result of movement of the cable means. Preferably, the cable means has one end connected with the retaining arm means and said cable drive mechanism includes an actuating means connected with the opposite end of the cable means, and a cable drive unit for moving the actuating means in a direction conforming to a direction of movement of the cable means. This feature makes it possible to provide the elevating means of a simplified structure.

Preferably, the cable drive mechanism is supported on the storage box forming the cutter die storage chamber to thereby facilitate mounting of the rotatory drive mechanism on, for example, top of the storage box where a relatively large space is available.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 8 is a right side view showing an important portion of the combination tool changer and storage device according to a second preferred embodiment of the present invention; and FIG. 9 is a front elevational view of the combination tool changer and storage device shown in FIG. 8.

DETAILED DESCRIPTION OF THE EMBODIMENTS

Figure 1:
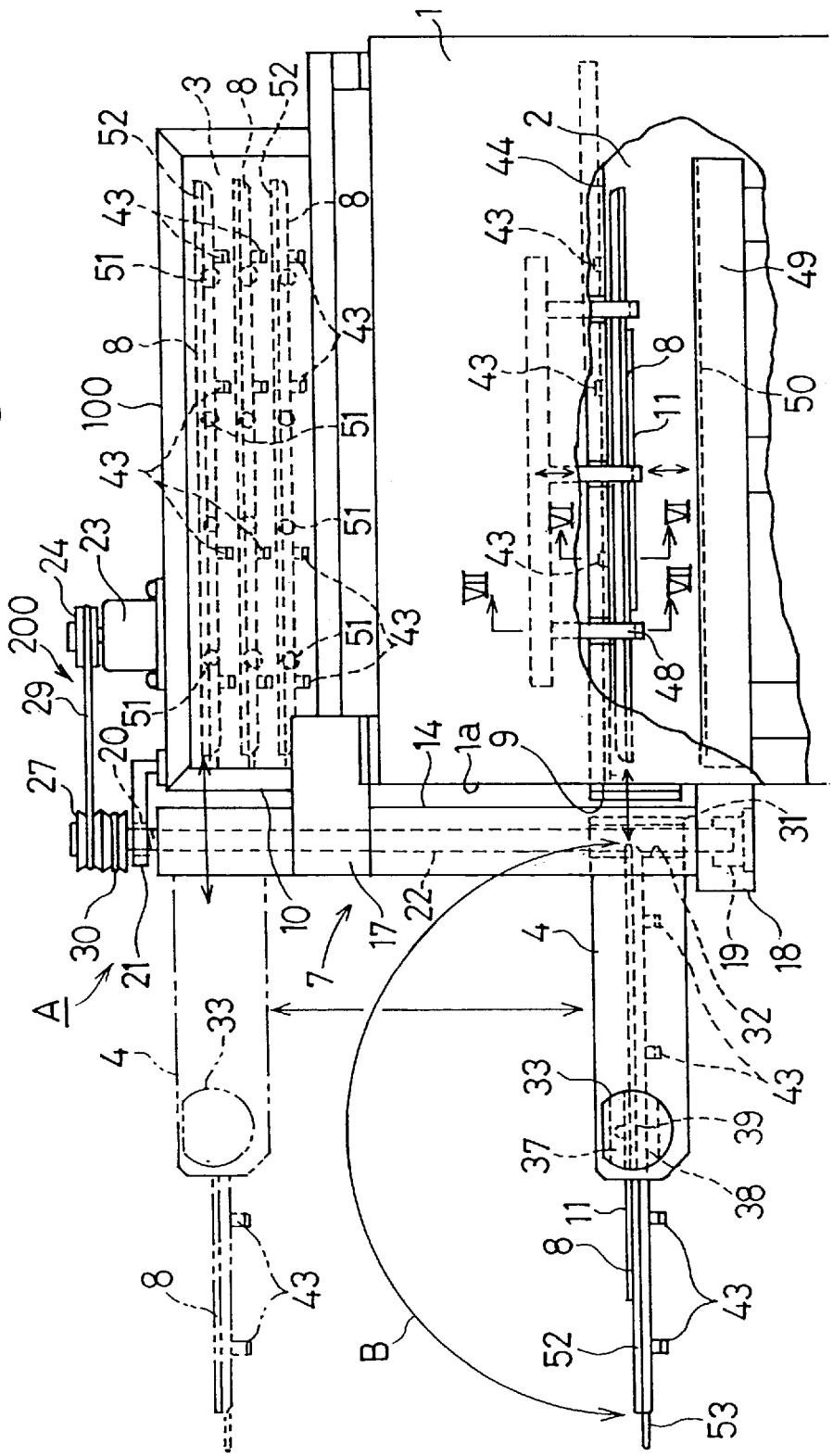
FIG. 1 is a right side view, with a portion cut away, showing an essential portion of a combination tool changer and storage device according to a first preferred embodiment of the present invention.
Figure 2:
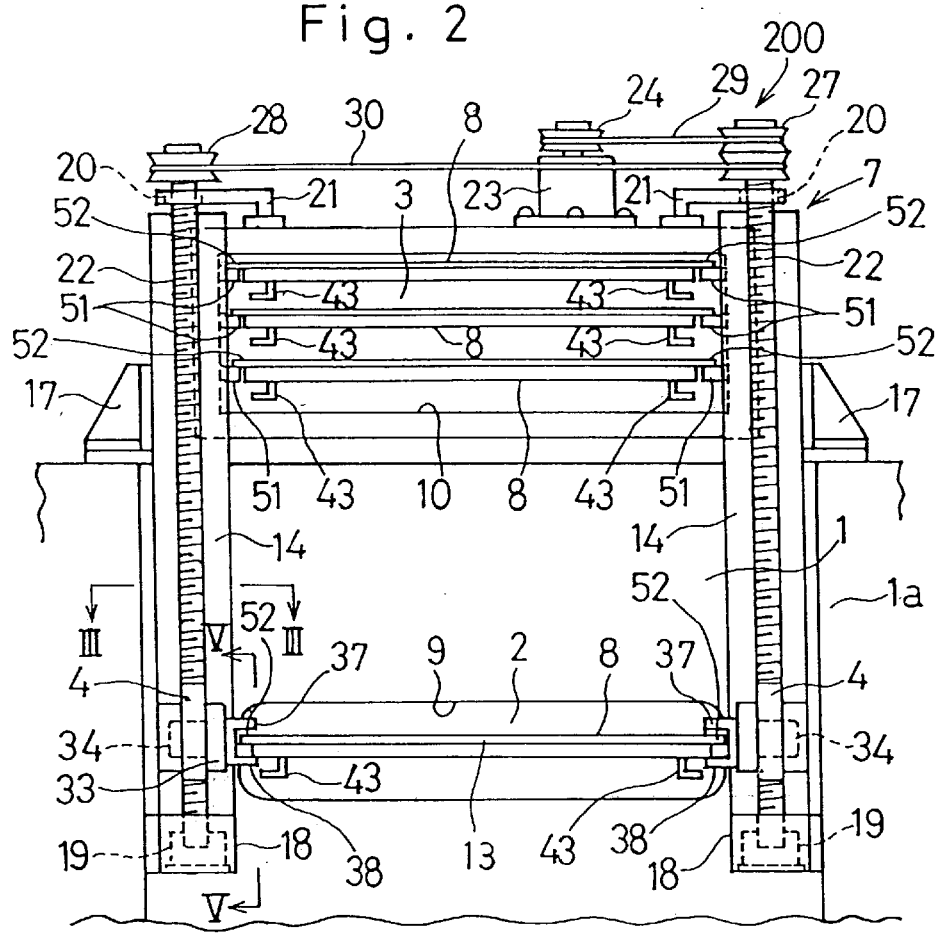
FIG. 2 is a front elevational view of the combination tool changer and storage device shown in FIG. 1.

Hereinafter, some preferred embodiments of the present invention will be described with reference to the drawings. In particular, FIG. 1 illustrates a right side view, with a portion cut away, showing a die cutter equipped with a combination tool exchanger and storage device according to a first preferred embodiment of the present invention, and FIG. 2 is a front elevational view thereof. In those figures, only a cutting unit of the die cutter, which constitutes subject matter of the present invention, is illustrated.

Referring to FIGS. 1 and 2, the die cutter comprises a cutting unit 1 and a combination tool exchanger and storage device A for profiled cutter dies mounted atop the cutting unit 1. The cutting unit 1 is of a generally box-like configuration having a cutter die mounting chamber 2 defined in the interior thereof. The combination tool exchanger and storage device A comprises a storage box 100 fixedly mounted atop the cutting unit 1 by means of fastening members such as, for example, bolts and defining a cutter die storage chamber 3 therein, left and right retaining arms 4 for holding left and right edges of a plurality of profiled cutter dies 8 which are generally referred to as chases, to support the latter, and an elevator unit 7 for driving the retaining arms 4 between a first position aligned with a first entrance 9 leading to and from the cutter die mounting chamber 2 and a second position aligned with a second entrance 10 leading to and from the cutter die storage chamber 3.

Figure 4:
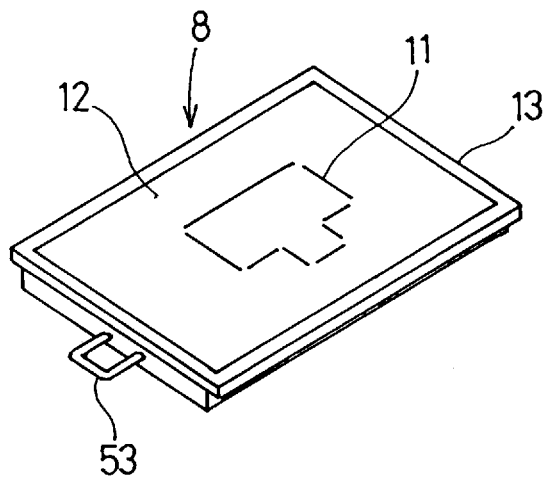
FIG. 4 is a schematic perspective view showing one of profiled cutter dies which can be employed in association with the combination tool changer and storage device shown in FIG. 1.

As shown in FIG. 4, each of the profiled cutter dies 8 is of a structure including a wooden template 12 having a cutter blade 11 of a different profile fitted thereto and a generally rectangular frame 13 made of iron and encircling the wooden template 12, said wooden template 12 and said rectangular frame 13 being connected together by means of a plurality of fastening members such as, for example, set bolts (not shown) in a manner known to those skilled in the art.

Figure 3:
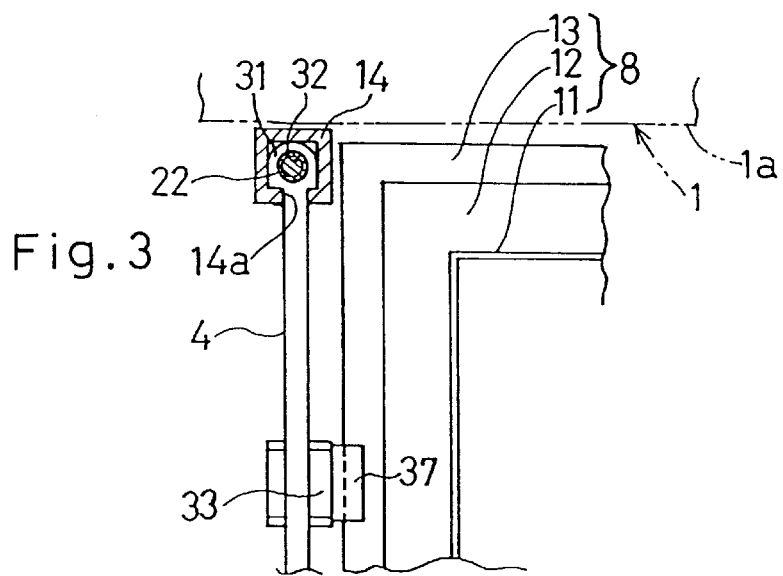
FIG. 3 is a cross-sectional view taken along the line III—III in FIG. 2.

FIG. 3 represents a cross-section taken along the line III—III in FIG. 2. Referring to FIG. 3, although each profiled cutter die 8 is, when removed out of and handled outside the cutter die mounting chamber 2, handled at all times with the respective cutter blade 11 oriented upwards to avoid the possibility of the cutter blade 11 being damaged, the individual profiled cutter die 8 is disposed within the cutter die mounting chamber 2 with the respective cutter blade 11 oriented downwards. In general, the cutter die storage chamber 3 accommodates a plurality of profiled cutter dies having respective cutter blades 11 of different configurations.

The elevator unit 7 includes, as shown in FIG. 2, upper and lower pairs of mounting brackets 17 and 18 fixed to respective front surface 1a of the cutting unit 1 by means of fastening members such as, for example, set bolts, left and right guide members 14 fixedly carried by the upper and lower pairs of mounting brackets 17 and 18, respectively, so as to extend upright along the adjacent front faces 1a of the cutting unit 1, left and right externally helically threaded rods such as, for example, ball screw rods 22 extending parallel respectively within the left and right tubular guides 14 in a direction lengthwise of the guide members 14, and a single drive motor 23 fixedly mounted atop the storage box 100 and providing a drive source for driving the ball screw rods 22 simultaneously. In this way, the combination tool changer and storage device A as a whole is detachably mounted on the cutting unit 1 by means of releasable connecting members.

Each of the left and right guide members 14 is, as best shown in FIG. 3, of a generally C-shaped cross-section having a longitudinal openings 14a and has upper and lower ends positioned, as shown in FIG. 2, on a respective side of the second entrance 10 communicated with the cutter die storage chamber 3 and the first entrance 9 communicated with the cutter die mounting chamber 2, respectively, while extending parallel to each other. The left and right guide members 14 are secured to the front face 1a of the cutting unit 1 with the longitudinal openings 14a confronting in a direction away from the cutter die mounting chamber 2.

Each of the ball screw rods 22 is accommodated within the associated guide member 14 and has a lower end rotatably received and supported by a thrust bearing 19 built in the lower bracket 18 while an upper end of the respective ball screw rod 22 is rotatably supported by a radial bearing 20 fitted to an upper support piece 21. A rotatory drive of the drive motor 23 mounted atop the storage box 100 can be transmitted to the right ball screw rod 22 through a toothed endless belt 29 drivingly trained between a toothed drive pulley 24, fixed on a drive shaft of the drive motor 23, and a driven toothed pulley 27 fixed on the upper end of the right ball screw rod 22 and also to the left ball screw rod 22 through a toothed endless belt 30 drivingly trained between the driven toothed pulley 27 and a driven toothed pulley 28 fixed on the upper end of the left ball screw rod 22. The driven pulleys 27 and 28 has the same size and, therefore, the left and right ball screw rods 22 can be driven about their own longitudinal axis in unison with each other. It is to be noted that the drive motor 23, the toothed pulleys 24, 27 and 28 and the toothed endless belts 29 and 30 altogether constitute a rotatory drive mechanism 200 for driving the left and right ball screw rods 22 in unison with each other.

The left and right retaining arms 4 are, as shown in FIG. 1, in the form of a generally rectangular elongated plate having inner and outer surfaces opposite to each other and are supported by the elevator unit 7 in a cantilever fashion so as to protrude outwardly from the front face 1a of the side walls of the cutting unit 1 while the respective inner surfaces of the left and right retaining arms 4 are held in face-to-face relation with each other and spaced a distance corresponding to the span between the left and right ball screw rods 22.

More specifically, as best shown in FIG. 3, each of the left and right retaining arms 4 has a base end 31 formed into a tubular body having an inner peripheral surface formed with a helical female thread 32 engageable with the associated ball screw rod 22. The base end 31 of each retaining arms 4 extends into and is received within the associated guide member 14 through the longitudinal opening 14a in the associated guide member 14 so that during rotation of the corresponding ball screw rod 22 about its own longitudinal axis, the base end 31 and, hence, the retaining arm 4 can be moved up and down along the ball screw rod 22 depending on the direction of turn of the ball screw rod 22 while held in sliding engagement with opposite side edges of the associated guide member 4 which confront the longitudinal opening 14a.

As shown in FIG. 1, a turret 33 is rotatably fitted to a free end of each of the left and right retaining arm 4 by means of a support shaft 34 (FIG. 2) extending through the respective retaining arm 4 such that the turrets 3 on the respective left and right retaining arms 4 confront with each other. As FIG. 5A which represents a cross-section taken along the line V—V in FIG. 2 makes it clear, one surface of each turret 33 remote from the associated retaining arm 4 is formed with rod-like support members 37 and 38 extending parallel to each other and spaced a distance slightly greater than the thickness of a side edge of each profiled cutter die 8. Accordingly, each profiled cutter die 8 can be supported and retained by the left and right retaining arms 4 with its opposite side edges slidably received in between the support members 37 and 38 of the respective turrets 33 carried by the retaining arms 4.

While one surface of the support member 38 in each of the turret 33 which faces the support member 37 is formed with a small protuberance 39, each of the opposite side edges of any one of the profiled cutter dies 8 has an intermediate portion formed with a recess 40 in which the protuberance 39 is engageable. On the other hand, one surface of the support member 37 in each of the turret 33 which faces the recess 40 in the support member 38 is formed with a generally semicircular-sectioned stationary groove 41 into which a respective fixing pin 42 extending retractably from the associated turret 33 can be slidably engaged.

Figure 5A:
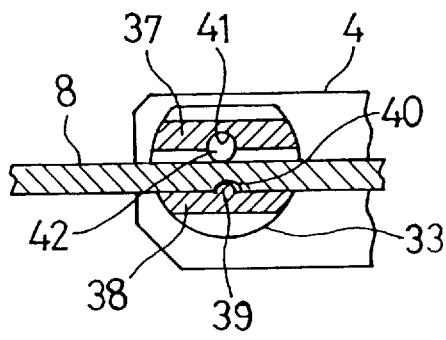
FIG. 5A is a cross-sectional view taken along the line V—V in FIG. 2.
Figure 5B:
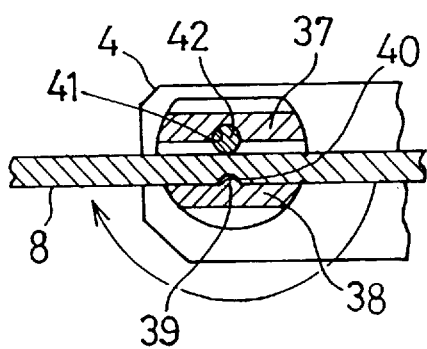
FIG. 5B is a cross-sectional view showing the profiled cutter die being fixed as a result of projection of fixing pins from a condition shown in FIG. 5A.

FIG. 5B illustrates the condition in which the fixing pin 42 protrudes from the associated turret 33 and is engaged in the stationary groove 41 and during this condition, the fixing pin 42 is engaged in between the support member 38 and the profiled cutter die 8 in a manner similar to a wedge so that the support member 38 can cooperate the support member 37 to fixedly sandwich the profiled cutter die 8 from opposite directions. The protuberance 39 in each of the turrets 33 has a height of protrusion of about 1 mm and, therefore, in a condition in which the fixing pin 42 is disengaged from the associated stationary groove 41 and is therefore retracted inwardly of the associated turret 33, the recess 40 in each side edge of the profiled cutter die 8 can easily ride over the protuberance 39 and is then trapped by the protuberance 39 when the profiled cutter die 8 is manually pushed so as to slide horizontally.

Figure 6A:
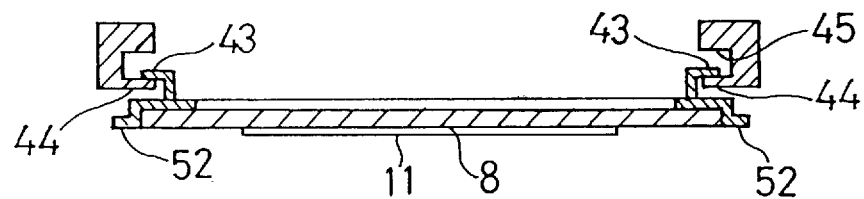
FIG. 6A is a cross-sectional view taken along the line VI—VI in FIG. 1.

One of the opposite surfaces of the profiled cutter die 8 opposite to the surface where the cutter blade 11 is provided has a plurality of sets, for example, four in the illustrated embodiment, hook members 43, one set of the hook members 43 being disposed on each of the opposite sides of the profiled cutter die 8 as shown in FIGS. 1 and 2. On the other hand, as shown in FIG. 6A representing a cross-section taken along the line VI—VI in FIG. 1, the cutter die mounting chamber 2 is provided with left and right guide rails 44 extending parallel to each other and operable to allow the profiled cutter die 8 to be guided therealong with the hook members 43 of the left and right sets engaged slidingly with the respective guide rails 44 in a generally handshake fashion.

Accordingly, when the profiled cutter die 8 retained by the retaining arms 44 so as to confront the first entrance 9 communicated with the cutter die mounting chamber 4 is manually pushed towards the cutter die mounting chamber 2, the profiled cutter die 8 can be guided into the cutter die mounting chamber 2 and towards a predetermined mounting position inside the cutter die mounting chamber 2 with the left and right sets of the hook members 44 slidingly guided along the respective guide rails 44.

Figure 7:
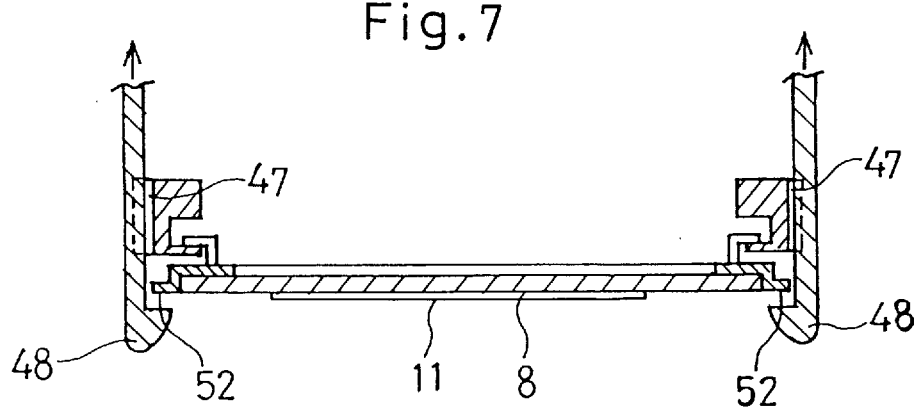
FIG. 7 is a cross-sectional view taken along the line VII—VII in FIG. 1.

The cutter die mounting chamber 2 is, as shown in FIG. 7 representing a cross-section taken along the line VII—VII in FIG. 1, equipped with left and right sets of a plurality of, for example, three, fixing latch members 48 supported for movement up and down. As shown in FIG. 1, the three fixing latch members 48 on each side of the cutter die mounting chamber 2 are positioned outside and spaced along the associated guide rail 44 and extend through respective clearance grooves 47 (FIG. 7), defined in a side portion of the guide rail 44, down to a position below the profiled cutter die 8. After the profiled cutter die 8 has been pushed manually to the predetermined mounting position inside the cutter die mounting chamber 2, the left and right sets of the latch members 48 are shifted upward to lift the profiled cutter die 8 with the opposite side edges thereof hooked from below by the latch members 48

Figure 6B:
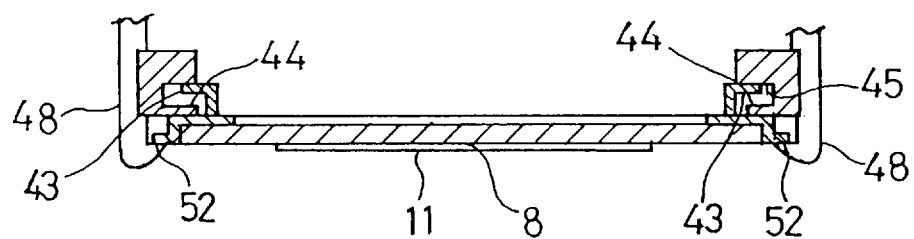
FIG. 6B is a sectional view showing the profiled cutter die having been fixed as a result of upward movement of latch members from a condition shown in FIG. 6A.

In this way, as shown in FIG. 6B, the profiled cutter die 8 is urged against a fixing plane 45 defined above the guide rails 44 and is then fixed thereat. A press board 49 positioned below the cutter die mounting chamber 2 shown in FIG. 1 is moved upwards with a stack of cardboards 50 placed on a top surface thereof, so that the stack of the cardboard 50 can be pressed against the wooden template 12 of the profiled cutter die 8. In this way, the stack of the cardboards 50 can be cut by the cutter blade 11 in a predetermined pattern complemental to the profile of the cutter die 8.

The cutter die storage chamber 3 has its interior so designed as to accommodate the profiled cutter dies 8 in three stages as shown in FIGS. 1 and 2. Specifically, the cutter die storage chamber 3 has its opposite side walls each having three stages of a plurality of, for example, four in the illustrated embodiment, rotary support members, for example, four roller bearings 51, which have their axis of rotation lying horizontally and which are spaced, for example, an equal distance from each other in a horizontal direction, each stage of the four roller bearings 51 on each side wall of the cutter die storage chamber 3 being associated with the respective profiled cutter die 8.

On the other hand, the rectangular frame 13 of each of the profiled cutter die 8 has its opposite sides formed with respective receiving pieces 52 protruding outwardly therefrom and positioned in a plane adjacent the surface of the wooden template 12 where the cutter blade 11 is disposed. Accordingly, when the retaining arms 4 are lifted by the elevator unit 7 and is subsequently halted at the position aligned with the desired mounting position of the cutter die storage chamber 3, the profiled cutter die 8 retained by the retaining arms 4 is, when the attendant worker pushes the profiled cutter die 8 on the retaining arms 4 into the second entrance 10, smoothly moved into and accommodated within the cutter die storage chamber 3 with the receiving piece 52 turning the associated stage of the roller bearings 51 about their own horizontal axis. A group of the roller bearings, four roller bearings 51 on each side wall of the cutter die storage chamber 3, is employed in three stages defined one above the other, to thereby define the three stages of spaces for accommodating the respective profiled cutter dies 8.

The drive motor 23 referred to above may be employed in the form of a pulse-controlled electric motor or a stepper motor and is controlled by a sequence controller (not shown). Accordingly, the retaining arms 4 can be selectively lowered or lifted to accurately assume the position aligned with the first entrance 9 of the cutter die mounting chamber 2 or the position aligned with the desired cutter die storage position adjacent the second entrance 10 of the cutter die storage chamber 3, respectively. For this reason, there is no need to employ any limit switches for positioning purpose and the retaining arms 4 can be highly accurately halted at the selected position.

The operation of the die cutter of the above described construction will now be described.

Referring to FIG. 1, the selected profiled cutter die 8 is fixed inside the cutter die mounting chamber 2 and the press board 49 is subsequently elevated to urge the stack of the cardboards 50 against the selected profiled cutter die 8 to cause the cutter blade 11 of the profiled cutter die 8 to cut the stack of the cardboards to thereby leave a corresponding stack of blanks of a profile corresponding to the profile of the cutter blade 11. During the die cutter being operated, the different profiled cutter die 8 which is to be used subsequently for cutting is to be prepared. More specifically, the iron frame 13 shown in FIG. 4 has to be mounted on the retaining arms 4 with its opposite side edges inserted in between the paired support members 37 and 38 shown in FIG. 2 so that the iron frame 13 straddle between the retaining arms 4. Thereafter, the wooden template 12 in FIG. 4 provided with the required cutter blade 11, which is to be used subsequently, is mounted in the iron frame 13 then supported by the retaining arms 4 and is then bolted to fixedly connect the wooden template 12 and the iron frame 13 to thereby complete assemblage of the profiled cutter die 8 to be used subsequently.

Assemblage of the profiled cutter die 8 in the manner described above is carried out when the retaining arms 4 are held at the position aligned with the first entrance 9 to the cutter die mounting chamber 2. However, the cutter assemblage position may be defined below the first entrance 9 if the guide members 14 and the associated ball screw rods 22 are extended to a position lower than those described in connection with the illustrated embodiment of the present invention. By so doing, the profiled cutter die 8 can easily be mounted on the retaining arms 4 then held at a relatively low position about near the floor and, therefore, loading and unloading of the profiled cutter die 8 to and from the retaining arms 4 can readily be accomplished.

After the next succeeding profiled cutter die 8 has been assembled completely on the retaining arm 4, the elevator unit 7 is controlled to undergo an elevating motion. In this way, the ball screw rods 22 are driven in the same direction about their own longitudinal axes by the rotatory drive transmitted from the drive motor 23 then driven in one direction, for example, in a positive direction, causing the retaining arms 4, with the helical female threads 32 of the retaining arms 4 meshed respectively with the helical threads on the ball screw rods 22, to move upwards from the position shown by the solid line in FIG. 1 at the same speed while maintaining the same height level with each other.

Accordingly, the next succeeding profiled cutter die 8 then mounted on the retaining arms 4 with its opposite side edge retained thereby is elevated while maintaining a horizontal position.

When the next succeeding profiled cutter die 8 being then elevated arrives at the position aligned with the cutter die storage position, then empty, within the cutter die storage chamber 3, the drive motor 23 is halted to allow the retaining arms 4 to assume, for example, the position shown by the double-dotted chain line in FIG. 1.

It is to be noted that the profiled cutter die 8 is mounted on the retaining arms 4 with the cutter blade 11 oriented upwards and that, during activation of the elevator unit 7 described above, the profiled cutter die 8 is prevented from being slid relative to the retaining arms 4 because as shown in FIG. 5B, the protuberances 39 engaged in the corresponding recesses 40 and, at the same time, the fixing pins 42 are engaged in the corresponding stationary grooves 41 to allow the profiled cutter die 8 to be firmly sandwiched between the fixing pins 42 and the support members 38.

When the retaining arms 4 are elevated to the position aligned with the cutter die storage chamber 3, the fixing pins 42 have to be manually disengaged from the corresponding stationary grooves 41 to allow the profiled cutter die 8 to be slidable relative to the retaining arms 4. Thereafter, when the attendant worker manually pushes the profiled cutter die 8, then mounted on the retaining arms, towards the second entrance 10 of the cutter die storage chamber 3 shown in FIG. 1, the profiled cutter die 8 is inserted into the cutter die storage chamber 3 with the recesses 40 riding over the protuberances 39, as shown in FIG. 5A, to allow the receiving pieces 52 (FIG. 2) to slide over the lower support members 38. Also, the profiled cutter die 8 is smoothly moved to the predetermined position within the cutter die storage chamber 3 because the receiving pieces 52 ride over the roller bearings 51, shown in FIG. 1, to thereby rotate roller elements of the roller bearings 51. The profiled cutter die 8 so inserted to the predetermined position inside the cutter die storage chamber 3 is stored thereat for the time to come. In this way, the profiled cutter die 8 which is to be used subsequently can be assembled during the operation of the die cutter and be stored at a place which does not constitute an obstruction to the work being performed.

The retaining arms 4 which is emptied as a result of the profiled cutter die 8 having been stored within the cutter die storage chamber 3 are lowered from the position shown by the double-dotted chain line in FIG. 1 down to the position shown by the solid line by causing the drive motor 23 of the elevator unit 7 to be driven in the opposite direction, that is, a negative direction, and is then aligned with the first entrance 9 of the cutter die mounting chamber 2. After the previous cutting operation has completed, the latch members 48 within the cutter die mounting chamber 2 are lowered to assume a condition shown in FIG. 7 and the profiled cutter die 8 is lowered from a condition shown in FIG. 6B to a condition shown in FIG. 6A, with the hook member 43 fast with the profiled cutter die 8 consequently engaged with the guide rails 44, thereby being suspended. After this profiled cutter die 8 has been temporarily removed from the cutter die mounting chamber 2 shown in FIG. 1 onto the retaining arms 4 by sliding the die 8, the profiled cutter die 8 is lifted to unload it from the retaining arms 4.

Thereafter, the empty retaining arms 4 are elevated by the action of the elevator unit 7 to the predetermined position aligned with the second entrance 10 of the cutter die storage chamber 3 and the next succeeding profiled cutter die 8 is removed from the cutter die storage chamber 3 and is then brought onto the empty retaining arms 4. At this time, the next succeeding profiled cutter die 8 smoothly slides above the rotating roller bearings 51 to allow the profiled cutter die 8 to be removed outward from the second entrance 10. Thus, a job of removing the profiled cutter die 8 can easily be accomplished.

The next succeeding profiled cutter die 8 so removed is firmly mounted on the retaining arms 4 while sandwiched between the fixing pins 42 and the support members 38 by causing the recesses 40 shown in FIG. 5A to be capped on the corresponding protuberances 39 to thereby position it and also causing the fixing pins 42 to protrude outward from the turrets 33 into the stationary grooves 41 as shown in FIG. 5B. Then the retaining arms 4 and, hence, the next succeeding profiled cutter die 8, are lowered by the action of the elevator unit 7 down to the position aligned with the first entrance 9 of the cutter die mounting chamber 2.

Figure 5C:
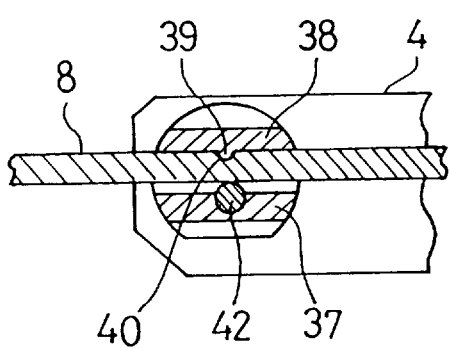
FIG. 5C is a cross-sectional view showing the profiled cutter die having been turned upside down from a condition shown in FIG. 5B.

When the profiled cutter die 8 is brought into alignment with the cutter die mounting chamber 2, the profiled cutter die 8 positioned by the engagement between the protuberances 39 and the corresponding recesses 40 with its opposite side edges sandwiched between the fixing pins 42 and the support members 38 as shown in FIG. 5B is turned substantially 180° manually by means of the handle 53 secured to a front edge thereof to allow the cutter blade 11 to be oriented downwards in readiness for actual mounting. At this time, in the rotary turrets 33, the fixing pins 42 are positioned below the profiled cutter die 8 as shown in FIG. 5C.

Figure 5D:
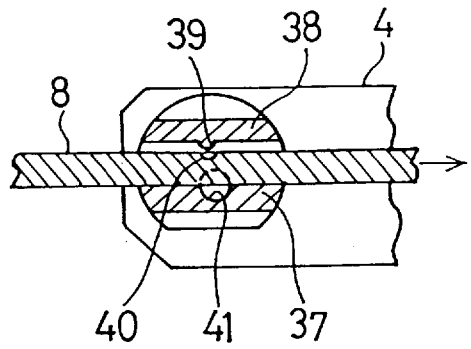
FIG. 5D is a cross-sectional view showing the profiled cutter die ready to be slid as a result of retraction of the fixing pins from the condition shown in FIG. 5C.

Subsequently, as shown in FIG. 5D, since the fixing pins 42 are retracted inwardly of the turrets 33, the profiled cutter die 8 is placed onto the support members 37 with the recesses 40 disengaged from the corresponding protuberances 39, allowing the profiled cutter die 8 to be slidable above the support members 37. When while in this condition the profiled cutter die 8 is slid horizontally relative to the retaining arms 4 and into the cutter die mounting chamber 2 shown in FIG. 1 and the profiled cutter die 8 is moved while being suspended to the predetermined cutter die mounting position within the cutter die mounting chamber 2 by a sliding movement of the hook members 43 towards the guide rails 44. Thereafter, the latch members 48 are moved upwards as hereinbefore described to firmly hold the profiled cutter die in position. In this way, the replacement of the profiled cutter die 8 can easily and readily be accomplished.

It is to be noted that the vertical motion of the retaining arms 4 is controlled by a control unit (not shown) which controls the drive motor 23.

FIG. 8 illustrates a right side view of the combination tool changer and storage device according to a second preferred embodiment of the present invention and FIG. 9 illustrates a plan view thereof. In those figures, component parts of the device which are likewise employed therein are designated by reference numerals which are similar to those employed in the foregoing description and, therefore, the details of the like component parts are not reiterated for the sake of brevity.

The die cutter according to this second embodiment of the present invention differs from that according to the foregoing embodiment in respect of the details of the elevator unit. The elevator unit now identified by 60 includes a pair of cables such as chains 63 which are employed to suspend the retaining arms 4. This elevator unit 60 is so designed and so structured as to be driven by a reciprocating motion of a piston rod 62 actuated by fluid operated cylinder device such as, for example, a hydraulic cylinder 61 which forms a drive source, to thereby selectively lift and lower the retaining arms 4. The hydraulic cylinder 61 is fixed atop the cutting unit 1 by means of respective pedestals 81 and 82 with the piston rod 62 oriented rearward (rightward as viewed in FIGS. 8 and 9). This piston rod 62 is coupled with generally intermediate portions of angled actuating members 64 of a generally U-shaped cross-section.

The actuating member 64 has bearing members 67 fixed to the opposite ends thereof, which bearing members 67 are slidable along respective guide shafts 68 in a direction conforming to the direction D of travel of the associated chain 63 and can be moved in a direction longitudinally of the cutting unit 1 with a pressing force of the piston rod 62 acting on the intermediate portion thereof, while retaining a relative position perpendicular to the associated piston rod 62. Each bearing member 64 has an outer face to which a guide roller 70 is fitted through a bearing 69, which guide roller 70 can roll on a guide rail 71, mounted on an upper surface of the cutting unit 1 so as to extend parallel to the associated guide shaft 68, to assist the actuating member 64 to move smoothly.

It is to be noted that the hydraulic cylinder 61, the piston rod 62, the actuating member 64 and others constitute a cable drive mechanism 300 for driving the chains 63. Of them, the hydraulic cylinder 61 and the piston rod 62 constitute a cable drive unit 310 for driving the actuating member 64 in a direction conforming to the direction D of travel of the chains 63.

On the other hand, guide members 72 are secured to the front face 1a of the cutting unit 1 so as to extend vertically along left and right sides of the first entrance 9 of the cutter die mounting chamber 2. As best shown in FIG. 9, each of the guide members 72 is of a generally H-shaped cross-section. Each guide member 72 has a top portion supported by a storage box 100 through a respective bracket 85 by means of fastening members such as, for example, bolts and also has a lower portion supported by the cutting unit 1 through a respective bracket 86 by means of fastening members such as, for example, bolts. The storage box 100 is mounted atop the cutting unit 1 through brackets 87 by means of fastening members such as, for example, bolts. In this way, the entire assembly of the combination tool changer and storage device A including the retaining arms 4, the guide members 72, the elevator unit 60 and the storage box 100 is detachably connected to the cutting unit 1 by means of fastening members.

The base end 31 of each of the retaining arms 4 has a retaining member 73 fixed thereto so as to embrace the associated guide member 72 and as to slidably engage the associated guide member 72. As best shown in FIG. 8, the retaining members 73 are employed in a pair one above the base end 31 of each retaining arm 4 and the other below the base end 31 of such retaining arm 4. The retaining arms 4 can move up and down in sliding contact with the associated guide members 72, while maintaining a horizontal position at all times, with the retaining members 73 of the respective pair engaged with the associated guide members 72.

Guide sprocket wheels 74 are mounted on respective left and right front portions of the top of the cutting unit 1 for guiding the associated chains 63. Each of the left and right chains 63 has one end rigidly connected with the base end 31 of the associated retaining arm 4 and the opposite end fixedly connected to the respective bearing 69, to thereby connect the retaining arm 4 and the respective actuating member 64 together.

It is to be noted that the cables may not be always limited to the chains referred to hereinabove, but may be toothed belts, toothless belts or wires.

Where the profiled cutter die 8 is desired to be lifted from the position aligned with the first entrance 9 of the cutter die mounting chamber 2 to the position aligned with the second entrance 10 of the cutter die storage chamber 3, an elevating command has to be supplied to a control unit (not shown) to actuate the hydraulic cylinder 61 to cause their piston rod 62 to project rearward to move the actuating member 64 to move rearward. At this time, the actuating member 64 is smoothly moved rearward of the cutting unit 1 with the bearing members 67 sliding along the guide shafts 68 and, at the same time, with the guide rollers 70 rolling along the guide rails 71.

Since the actuating member 64 is moved while maintaining at all times a position lying perpendicular to the piston rod 62, the left and right chains 63 fixed to the opposite ends thereof can be equally pulled rearward. Accordingly, the left and right arms 4 elevate pulled by the respective chains 63. When the retaining arms 4 so moved arrive at the upper limit position as shown by the double-dotted chain line in FIG. 8, an approach sensor (not shown) detects the arrival of the retaining arms at the upper limit positions to thereby bring the hydraulic cylinder 61 to a halt.

On the other hand, where the profiled cutter die 8 is desired to be lowered from the position aligned with the second entrance 10 of the cutter die storage chamber 3 down to the position aligned with the first entrance 9 of the cutter die mounting chamber 2, a lowering command has to be supplied to the control unit to actuate the hydraulic cylinder 61 with the piston rod 62 consequently moved forwards (leftward as viewed in FIGS. 8 and 9). As a result, the retaining arms 4 are lowered by the effect of their own weight incident to the forward movement of the piston rod 62. When the retaining arms 4 so moved are lowered down to the lower limit position shown by the solid line, a limit switch (not shown) detects the arrival of the retaining arms 4 at the lower limit position to thereby bring the hydraulic cylinder 61 to a halt.

It is to be noted that instead of the piston rod 62 being driven by the hydraulic cylinder 61 to move the actuating member 64, arrangement may be made such that the actuating member 64 can be moved by rotating screw rod by means of a drive motor.

Although in any one of the foregoing preferred embodiments of the present invention the cutter die storage chamber 3 has been shown and described as disposed on the top of the cutting unit 1, the cutter die storage chamber 3 may, if a space is available below the cutting unit 1, be disposed below the cutting unit 1, or the cutter die storage chamber 3 may be disposed not only on the top of the cutting unit 1, but also below the cutting unit 1.

Also, although in any one of the foregoing preferred embodiments of the present invention loading and unloading of the profiled cutter die into and from each of the cutter die storage chamber 3 and the cutter die mounting chamber 2, respectively, have been described as performed by the attendant worker, these loading and unloading can be automated by the use of, for example, air cylinders.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A combination tool exchanger and storage device adapted to be fitted to a die cutter for exchanging and storing a plurality of profiled cutter dies each usable to cut a sheet-like material by urging the sheet-like material against a selected one of the profiled cutter dies retained within a cutter die mounting chamber of the die cutter, said combination tool exchanger and storage device comprising:

a retaining arm means for holding one of the profiled cutter dies so as to confront a first entrance leading to the cutter die mounting chamber and for sliding the profiled cutter die horizontally towards the cutter die mounting chamber;

a cutter die storage chamber disposed above or below the die cutter; and an elevating means for selectively driving the retaining arm means between a first position aligned with the first entrance leading to the cutter mounting chamber and a second position aligned with a second entrance leading to the cutter die storage chamber.

2. The combination tool changer and storage device as claimed in claim 1, further comprising a plurality of rotary support members disposed within the cutter die storage chamber for slidably supporting any one of the profiled cutter die with respect to the second entrance leading to the cutter die storage chamber.

3. The combination tool changer and storage device as claimed in claim 2, further comprising pairs of rotary support groups each comprising a plurality of rotary support members disposed on a common plane are disposed in a plurality of stages, and a plurality of stages of storage spaces one for accommodating each profiled cutter die are formed.

4. The combination tool changer and storage device as claimed in claim 1, wherein said elevating means comprises a screw rod disposed at a front plane, where the first entrance is formed in a cutting unit of the die cutter, so as to extend vertically and threadingly engaged with the retaining arm means, a rotary drive mechanism for driving the screw rod, and guide means for guiding the retaining arm means up and down along the screw rod as a result of rotation of the screw rod.

5. The combination tool changer and storage device as claimed in claim 4, wherein said rotatory drive mechanism includes a drive motor for driving the screw rod, said drive motor being supported on a storage box forming the cutter die storage chamber.

6. The combination tool changer and storage device as claimed in claim 1, wherein said elevating means comprises a cable means for suspending the retaining arm means, a cable drive mechanism for moving the cable means, and a guide means for moving the retaining arm means up and down as a result of movement of the cable means.

7. The combination tool changer and storage device as claimed in claim 6, wherein said cable means has one end connected with the retaining arm means and said cable drive mechanism includes an actuating means connected with the opposite end of the cable means, and a cable drive unit for moving the actuating means in a direction conforming to a direction of movement of the cable means.

8. The combination tool changer and storage device as claimed in claim 6, wherein said cable drive mechanism is supported inside the storage box forming the cutter die storage chamber.

9. A die cutter for cutting a sheet-like material by urging the sheet-like material against a profiled cutter die, said die cutter comprising a combination tool changer and storage device adapted to be fitted to said die cutter for exchanging and storing a plurality of profiled cutter dies each usable to cut a sheet-like material by urging the sheet-like material against a selected one of the profiled cutter dies retained within a cutter die mounting chamber of the die cutter, said combination tool exchanger and storage device comprising:

a retaining arm means for holding one of the profiled cutter dies so as to confront a first entrance leading to the cutter die mounting chamber and for sliding the profiled cutter die horizontally towards the cutter die mounting chamber;

a cutter die storage chamber disposed above or below the die cutter; and an elevating means for selectively driving the retaining arm means between a first position aligned with the first entrance leading to the cutter mounting chamber and a second position aligned with a second entrance leading to the cutter die storage chamber.

* * * * *